United States Patent
Ahn et al.

(10) Patent No.: US 8,094,743 B2
(45) Date of Patent: Jan. 10, 2012

(54) SPATIAL MODULATION METHOD AND TRANSMITTING AND RECEIVING APPARATUSES USING THE SAME IN A MULTIPLE INPUT MULTIPLE OUTPUT SYSTEM

(75) Inventors: Chang-Wook Ahn, Gwangju (KR); Sang-Boh Yun, Seongnam-si (KR); Eung-Sun Kim, Suwon-si (KR); Harald Haas, Bremen (DE); Mesleh Raed, Bremen (DE); Tae-In Hyon, Hwaseong-si (KR); Stephen McLaughlin, Edinburgh (GB)

(73) Assignees: Samsung Electronics Co., Ltd., Suwon-si (KR); The University Court of the University of Edinburgh, Edinburgh (GB)

( * ) Notice: Subject to any disclaimer, the term of this patent is extended or adjusted under 35 U.S.C. 154(b) by 1052 days.

(21) Appl. No.: 11/822,872

(22) Filed: Jul. 10, 2007

(65) Prior Publication Data
US 2008/0037673 A1 Feb. 14, 2008

(30) Foreign Application Priority Data
Jul. 11, 2006 (KR) ........................ 10-2006-0064934

(51) Int. Cl.
*H04B 7/02* (2006.01)
(52) U.S. Cl. ....................................................... 375/267
(58) Field of Classification Search .......... 375/260–262, 375/265–267, 285, 295, 299, 316, 347; 370/208, 370/334, 350; 455/562.1, 101
See application file for complete search history.

(56) References Cited

U.S. PATENT DOCUMENTS

| | | | |
|---|---|---|---|
| 7,505,788 B1 * | 3/2009 | Narasimhan | 455/562.1 |
| 7,539,264 B2 * | 5/2009 | Hwang et al. | 375/267 |
| 2004/0174939 A1 | 9/2004 | Wang | |
| 2005/0113042 A1 | 5/2005 | Felter | |
| 2005/0113141 A1 * | 5/2005 | Felter | 455/562.1 |
| 2005/0195914 A1 | 9/2005 | Kim et al. | |
| 2006/0018247 A1 * | 1/2006 | Driesen et al. | 370/208 |
| 2006/0098568 A1 | 5/2006 | Oh et al. | |
| 2006/0159160 A1 * | 7/2006 | Kim et al. | 375/148 |
| 2007/0009058 A1 * | 1/2007 | Lee et al. | 375/267 |
| 2007/0025467 A1 * | 2/2007 | Li | 375/299 |
| 2007/0099584 A1 * | 5/2007 | Niu et al. | 455/101 |

FOREIGN PATENT DOCUMENTS

| | | |
|---|---|---|
| KR | 10-2004-0077576 A | 9/2004 |
| KR | 10-2005-0090230 A | 9/2005 |
| KR | 10-2006-0042523 A | 5/2006 |

OTHER PUBLICATIONS

Li Yingxue, U.S. Appl. No. 60/702,973, filed Jul. 27, 2005.*
Korean Decision on Grant issued on Dec. 10, 2010, in counterpart Korean Application No. 10-2006-0064934 (5 pages, in Korean, no English translation).

* cited by examiner

*Primary Examiner* — Khanh C Tran
(74) *Attorney, Agent, or Firm* — NSIP Law (57) ABSTRACT

A spatial modulation method and transmitting and receiving apparatuses using the spatial modulation method in a MIMO system are provided. The spatial modulation method uses an index of an activated antenna and a signal modulation constellation as an information source. The spatial modulation method is applied to the transmitting apparatus. The receiving apparatus uses a spatial modulation detection method in which a channel path gain is repeatedly multiplied to detect the spatially modulated signal efficiently.

29 Claims, 8 Drawing Sheets

SPATIAL MODULATION METHOD AND TRANSMITTING AND RECEIVING APPARATUSES USING THE SAME IN A MULTIPLE INPUT MULTIPLE OUTPUT SYSTEM

CROSS-REFERENCE TO RELATED PATENT APPLICATION

This application claims the benefit under 35 U.S.C. §119 (a) of a Korean Patent Application filed in the Korean Intellectual Property Office on Jul. 11, 2006 and assigned Serial No. 2006-64934, the entire disclosure of which is hereby incorporated by reference.

BACKGROUND OF THE INVENTION

1. Field of the Invention

The present invention relates generally to a Spatial Modulation (SM) method, and transmitting and receiving apparatuses using the same in a Multiple Input Multiple Output (MIMO) system. More particularly, the present invention relates to a transmitting apparatus using an SM method and a receiving apparatus using an SM detection method based on Iterative Maximum Ratio Combining (i-MRC) in a MIMO system.

2. Description of the Related Art

Over the past few years, the wireless communications field has witnessed a remarkable growth, shifting from $3^{rd}$ Generation (3G) communications to $4^{th}$ Generation (4G) broadband wireless communications. A radio signal from a transmitter is propagated in multiple paths, not directly to a receiver under a radio communication environment. Accordingly, it is a critical issue to reduce multipath signal distortion.

Compared to a Single Input Single Output (SISO) wireless system, a MIMO system is excellent in terms of capacity and quality. Despite these benefits, the MIMO system has many challenging issues to tackle in order to increase capacity gains. In other words, MIMO transmission is significantly affected by a spatial layout of transmitter antennas and receiver antennas, and synchronization is required among the transmitter antennas. Moreover, there is a shortage of algorithms available for MIMO transmission and Inter-Channel Interference (ISI) occurs at the receiver.

ISI cancellation algorithms have been proposed recently. A major algorithm is a MIMO detection algorithm called Bell Labs Layered Space-Time Architecture (BLAST). A basic BLAST, Vertical-BLAST (V-BLAST), separates multiple transmission data streams and detects them successively by an array processing and interference cancellation technique. A V-BLAST multi-antenna technology utilizes spatial diversity to achieve high Signal-to-Noise Ratio (SNR). While the MIMO system has an improved SNR due to a diversity gain, as spectral efficiency increases, the parallel signal transmission experiences more severe distortion. Accordingly, there exists a need for increasing the spectral efficiency without distortion.

Orthogonal Frequency Division Multiplexing (OFDM) is efficient in reducing the multipath distortion of a frequency selective channel. In OFDM, the frequency selective channel is converted to a set of parallel frequency flat fading channels. OFDM divides a frequency into mutually orthogonal subcarriers to thereby cope with overlapping between signals frequencies. Thus, OFDM utilizes an available bandwidth very efficiently. As a result, OFDM was adopted as the standard for Institute of Electrical and Electronics Engineers (IEEE) 802.11a/16a Wireless Metropolitan Area Network (WMAN) and Wireless Local Area Network (WLAN). However, since a MIMO-OFDM system suffers from high demodulation complexity for each lower-layer subcarrier, an algorithm for reducing the complexity is required.

Accordingly, there is a need for an improved spatial modulation method, and transmitting and receiving apparatuses using spatial modulation for reducing high demodulation complexity.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a MIMO system for obviating the need for synchronization among transmitter antennas by activating one transmitter antenna, and not causing ISI at a receiver.

Exemplary embodiments of the present invention provide a method for increasing transmission efficiency per unit hertz using the spatial layout of transmitter antennas as information and a transmitter using the same.

Exemplary embodiments of the present invention provide a detection method for achieving a spatial multiplexing gain, while reducing the demodulation complexity of a receiver and a receiver using the same in a MIMO-OFDM system.

According to one aspect of exemplary embodiments of the present invention, in a spatial modulation method in a MIMO system, a signal with a plurality of bits is received and separated into an antenna index bit block and a signal modulation bit block. The signal modulation bit block is encoded in a signal modulation scheme, and the antenna index bit block is encoded with the index of an antenna to be activated.

According to another aspect of exemplary embodiments of the present invention, in a transmitter using spatial modulation in a MIMO system, a separator receives a signal with a plurality of bits and separates the received signal into an antenna bit block and a signal modulation bit block. A signal modulation encoder encodes the signal modulation bit block in a signal modulation scheme, and an antenna index encoder encodes the antenna bit block with the index of an antenna to be activated.

According to a further aspect of exemplary embodiments of the present invention, in a method of detecting a spatial modulation signal in a MIMO system, a detected vector is calculated by multiplying a received signal by a channel path gain repeatedly. An antenna index is estimated using a maximum absolute value of an independent variable of the detected vector, and a transmitted symbol is estimated using a constellation of a detected column vector of a quantization function, when the estimated antenna index is equal to the antenna index.

According to still another aspect of exemplary embodiments of the present invention, in a receiver using spatial modulation signal detection in a MIMO system, a plurality of receiver antennas receive a signal from transmitter antennas. A detector estimates an antenna index and a transmitted symbol from the received signal, and a spatial demodulator decodes an antenna bit block using the estimated antenna index and decodes a signal modulation bit block using the estimated transmitted symbol.

According to yet another aspect of exemplary embodiments of the present invention, in a MIMO system using spatial modulation and spatial modulation detection, a spatial modulator encodes the index of an activated antenna to a multi-symbol signal. A plurality of transmitter antennas sends the modulated signal through one activated antenna during a unit time. A plurality of receiver antennas receives the modulated signal from the transmitter antennas. A detector estimates an antenna index and a transmitted symbol from the received signal, and a spatial demodulator decodes the signal of the spatial modulator.

BRIEF DESCRIPTION OF THE DRAWINGS

The above and other objects, features and advantages of certain exemplary embodiments of the present invention will be more apparent from the following detailed description when taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention are intended to provide an SM method for increasing spectral efficiency. The SM method characteristically uses one activated transmitter antenna per unit time in a MIMO system, thereby not causing ICI and obviating the need for synchronization. Also, since the SM method utilizes an index of the activated antenna as an information source, it remarkably increases transmission capacity per unit hertz.

Signal Space Multiplexing (SSM) encodes multiple information symbols to one information symbol. A transmitter sends the code symbol through a single activated transmitter antenna among a plurality of transmitter antennas. A receiver detects the index of the activated antenna. For the detection, Minimum Mean Square Error (MMSE), Zero-Forcing (ZF) or i-MRC of the present invention is available. The i-MRC outperforms other algorithms by reducing demodulation complexity at the receiver.

While SSM encodes multiple information symbols, only Binary Phase Shift Keying (BPSK) or Quadrature Phase Shift Keying (QPSK) are available for SSM and the use of parity bit symbols leads to the decrease of network efficiency. To overcome this problem, SM is used in the exemplary embodiments of the present invention.

SM utilizes the index of a transmitter antenna activated among a plurality of transmitter antennas as an information source, without using parity bits. A signal with a plurality of bits is modulated to multiple symbols in a signal area and a spatial area. In the signal area, a signal modulation bit block is encoded on a signal constellation corresponding to a given modulation scheme. In the spatial area, an antenna bit block is encoded according to the index of an antenna to be activated.

To achieve higher data rate, SM is combined with OFDM. Each OFDM subcarrier is sent through one transmitter antenna in each predetermined time interval, while the other antennas are off during the time interval. The combination of SM and OFDM reduces OFDM demodulation complexity according to an exemplary embodiment of the present invention.

The symbols and terms used herein are defined as follows.

$(\cdot)^-$: inverse
$(\cdot)^*$: conjugate
$(\cdot)^+$: pseudoinverse
$(\cdot)^H$: Hermitian matrix
$(\cdot)^T$: transpose matrix or vector
$h_{VK}$: a channel vector between a transmit antenna V and a receive antenna K
$N_t$: the number of transmit antennas
$R_t$: the number of receive antennas
$m=\log_2(M)$: the number of bits/symbols in M-ary Quadrature Amplitude Modulation (M-QAM)

SSM System

Figure 1:
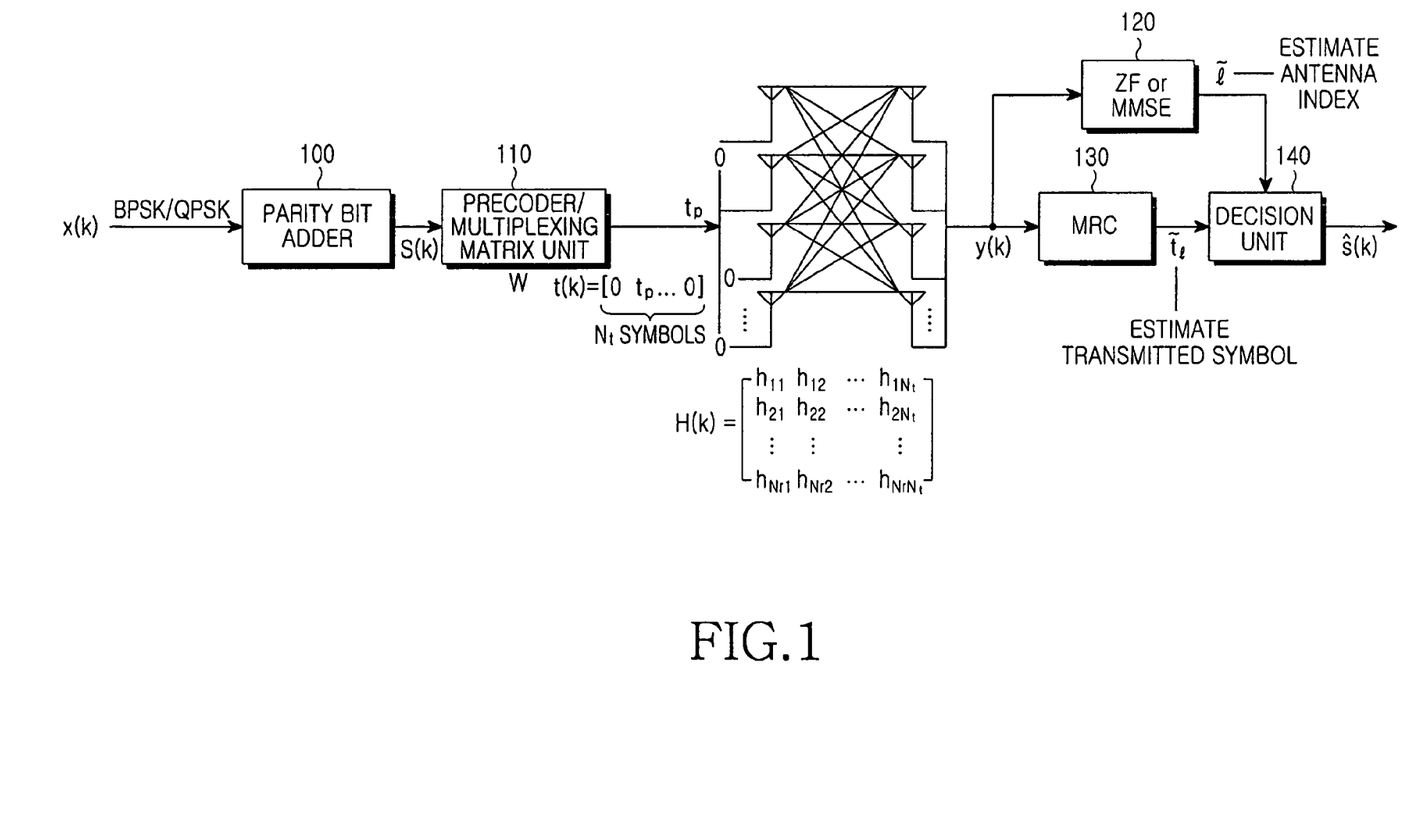
FIG. 1 is a block diagram of a MIMO system using Signal Space Multiplexing (SSM) according to an exemplary embodiment of the present invention.

With reference to FIG. 1, an SSM-MIMO system will be described.

FIG. 1 is a block diagram of an SSM-MIMO system according to an exemplary embodiment of the present invention. Referring to FIG. 1, an input signal x(k) is converted to a vector s(k) of a symbol duration $T_s$ through BPSK/QPSK signal modulation and adding of parity bits. Here, a parity bit adder 100 adds elements so that the sum of all elements is 0. A precoder/multiplexing matrix unit 110 pre-codes s(k) and converts the precoded s(k) to a multiplexing matrix t(k) having all 0s except for one element.

A transmitter sends signal power through one antenna corresponding to the non-zero symbol for a unit time. Since s(k) and t(k) are equal in symbol duration, no additional bandwidth is required. A receiver estimates the index of the transmitter antenna using a ZF or MMSE detector 120 and estimates the transmitted symbol using a Maximum Ratio Combiner (MRC) 130. In this way, the received signal s(k) is recovered.

A description will be made of SSM in the case of $N_t=R_t=4$.

It is assumed that out of four symbols, two symbols are data symbols and the other two symbols are parity symbols. The data symbols are first elected from a BPSK/QPSK constellation diagram, and the parity symbols are added such that the sum of all elements of the transmission vector s(k) is 0. Then the vector s(k) is multiplied by a precoding/multiplexing matrix which can be a Hadamard matrix for BPSK or a Fourier matrix for QPSK.

All possible element combinations for s(k) are produced by multiplying a Fourier matrix or its complex conjugate by −1. The Fourier matrix is a unitary matrix with (W*W=I) where I is an identical matrix with the same size as W. As a result, the vector t(k) is composed of $N_t$ elements containing one non-zero element. In the illustrated case of FIG. 1, if t(k)=[0, t1, 0, 0], the second antenna only is activated.

The signal received at the receiver is expressed as y(k)=H(k)t(k)+r(k) where H(k) is a flat Rayleigh fading channel matrix, and r(k) is a noise vector with integrity in time and space, that is, $E\{r(k)r(z)\}=N_o I_{N_r}\delta[k-z]$.

MRC is used for estimation of a transmission symbol $t_l$ and ZF or MMSE is used for estimation of the index l of the transmit antenna that transmitted $t_l$. The estimated antenna indexes $\tilde{l}_{ZF}$ and $\tilde{l}_{MMSE}$ are calculated by $$\tilde{l}_{ZF} = \arg\max(|H^+y|)$$

$$\tilde{l}_{MMSE} = \arg\max(|[H^HH+I_{N_t}/\zeta]^{-1}H^Hy|) \quad (1)$$

where $\zeta$ represents the SNR of the input at the receiver. Assuming that the estimation is correct, the transmission vector is estimated by $$\hat{s} \times (k) = \sqrt{4}(\tilde{t}_l^* <W>_j)^* \quad (2)$$

where $<W>_j$ represents the index j of a column in the matrix W.

BPSK transmission and QPSK transmission in the SSM model will be described below.

In BPSK transmission, assuming that symbols x=[−1, 1, −1] are sent in this order, a parity symbol is added to the symbols so that the sum of the symbols are 0. The resulting vector symbol s=[−1, 1, −1, 1] is multiplexed and then multiplied by the following Hadamard matrix.

$$W = \frac{1}{\sqrt{4}} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Thus, t=[0, −1, 0, 0] which implies that $t_l$=−1 is sent through a second antenna. If the receiver makes the right decision that $\tilde{l}$=2 and $\tilde{t}_l$=−1 as indicated at decision unit 140, a demultiplexed signal is calculated. Thus, ŝ(k)=[−1, 1, −1, 1].

In QPSK transmission, assuming that symbols x=[−i, 1] (that is, i=$\sqrt{-1}$) are sent in this order, parity symbols are added. The resulting vector symbol s=[−i, 1, i, −1] is multiplexed and multiplied by the following Fourier matrix. As a result, t=[0, −i, 0, 0] which implies that $t_l$=−i is sent through the second antenna. If the receiver makes the right decision that $\tilde{l}$=2 and $\tilde{t}_l$=−i as indicated at decision unit 140, a demultiplexed signal is calculated. Thus, ŝ(k)=[−i, 1, i, −1].

However, the SSM scheme reduces transmission efficiency and limits the signal modulation to BPSK and QPSK due to the addition of parity bits.

SM and SM-Based Transmitter

Figure 2:
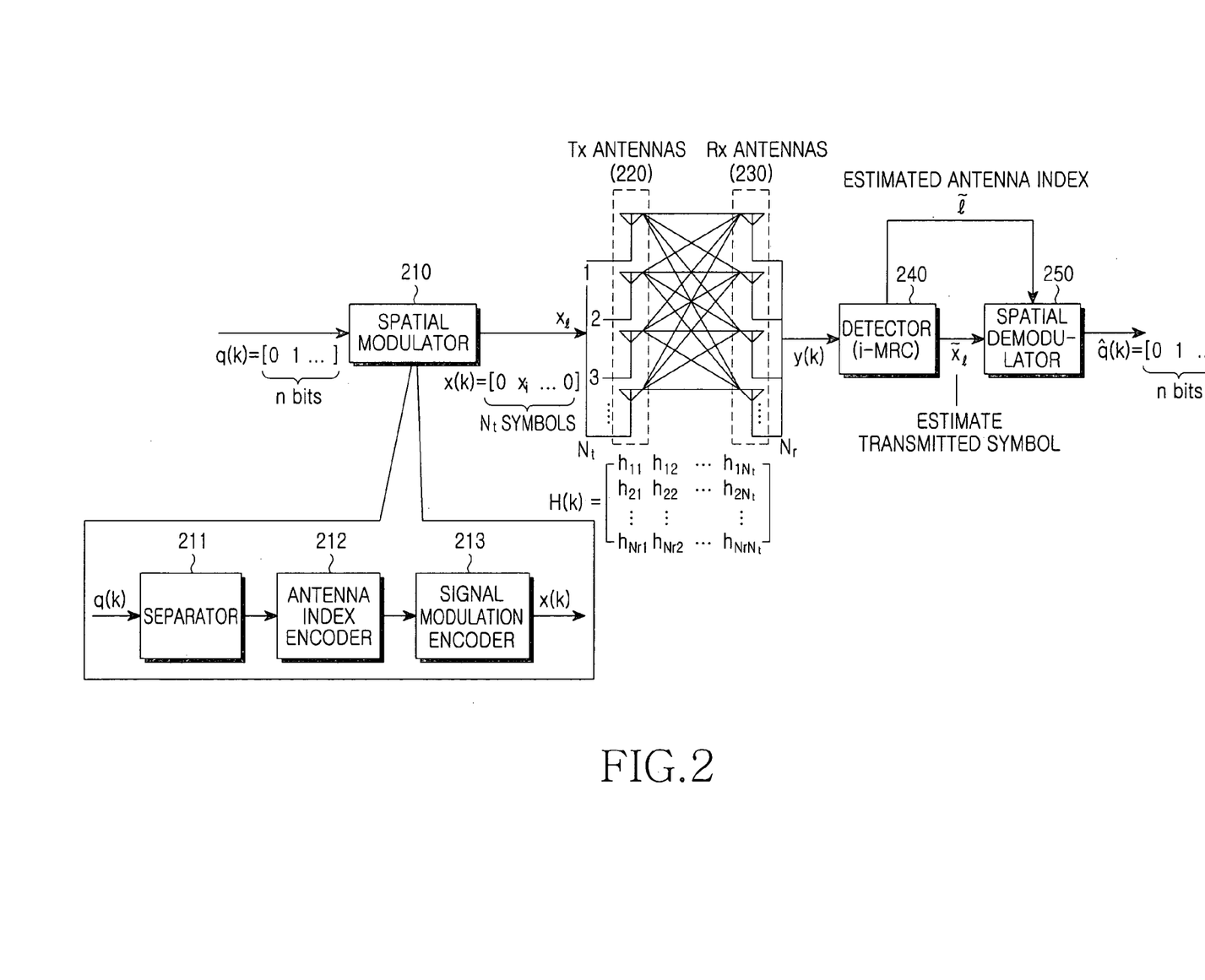
FIG. 2 is a block diagram of a MIMO system using SM according to an exemplary embodiment of the present invention.
Figure 3:
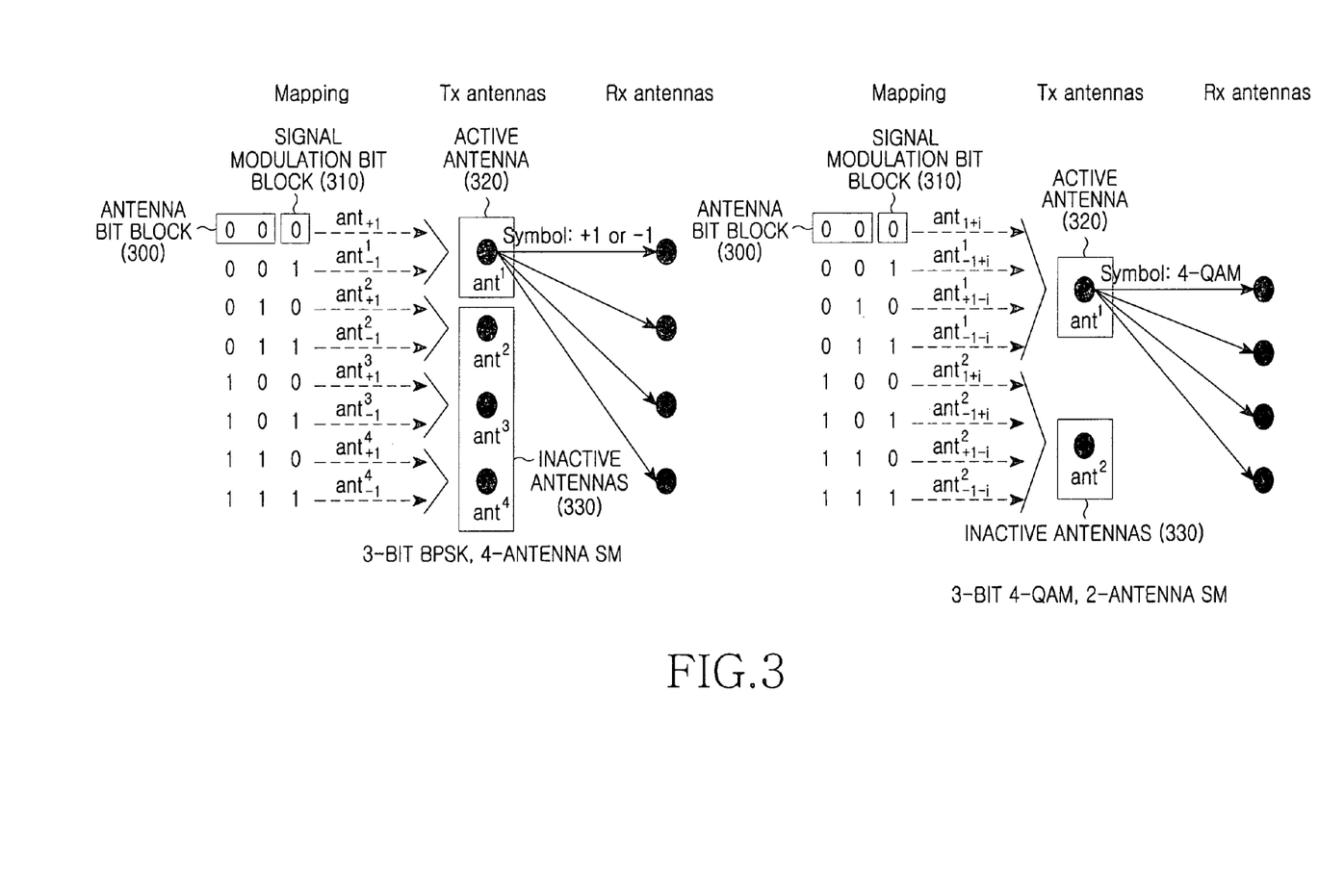
FIG. 3 illustrates an SM method according to an exemplary embodiment of the present invention.

With reference to FIGS. 2 and 3, an SM method and a transmitter using the SM method in a MIMO system will be described.

FIG. 2 is a block diagram of a MIMO system according to an exemplary embodiment of the present invention and FIG. 3 illustrates an SM method according to an exemplary embodiment of the present invention. The SM method according to an exemplary embodiment of the present invention offers higher network efficiency due to non-use of parity bits, while taking the advantages of the SSM method. In addition, the SM method is not limited to PSK (BPSK or QPSK) and Amplitude Shift Keying (ASK), Frequency Shift Keying (FSK), and M-QAM are also available.

Referring to FIG. 2, a transmitter according to an exemplary embodiment of the present invention includes a spatial modulator 210 and a plurality of transmitter antennas 220. The spatial modulator 210 is comprised of a separator 211, an antenna index encoder 212, and a signal modulation encoder 213. The separator 211 separates an information signal including a plurality of bits into an antenna bit block 300 and a signal modulation bit block 310. The signal modulation encoder 213 encodes the signal modulation bit block 310 on a signal modulation constellation. The antenna index encoder 212 encodes the antenna bit block 300 with the index of an activated antenna. The plurality of antennas 220 sends the modulated signal to a receiver through one antenna activated per unit time.

For example, an input signal q(k) includes N bits. The spatial modulator 210 spatially modulates q(k) to x(k). The signal x(k) is a signal with $N_t$ symbols ($N_t$ is the total number of transmitter antennas). The spatial modulator 210 applies a signal modulation constellation value to a symbol position corresponding to the activated antenna in x(k), while setting 0s at the other symbol positions of x(k) corresponding to the remaining inactive antennas. An antenna index is denoted by l and a transmission symbol is denoted by $x_l$. Then l ∈ [1: $N_t$] is mapped to the index of a transmit antenna. A first (1$^{st}$) antenna among the plurality of antennas sends the symbol $x_l$ on a MIMO channel with an H(K) channel matrix. H(K) can be modeled to a flat Rayleigh fading channel or a Rician fading channel. The channel modeling is dependent on the existence of Line Of Sight (LOS) between a transmitter antenna and a receiver antenna.

In case of Non-LOS (NLOS), the sum of scattered components is modeled to a zero mean complex Gaussian random process expressed as $$\mu(t) = \mu_1(t) + i\mu_2(t) \quad (3)$$

where $\mu_1(t)$ and $\mu_2(t)$ are the real values of Gaussian random processes and statistically uncorrelated. The variance of each process is 0.5. As a result, the random process of $\mu(t)$ has a phase with a uniform distribution and an amplitude with a Rayleigh distribution. The channel components are created from the transmitter antennas and the receiver antennas, and the total channel power is normalized to one channel power at each transmission time instant.

Therefore, the statistic flat fading Rayleigh channel matrix is flat over all modeled frequency components.

In case of LOS, the MIMO channel matrix is modeled to the sum of a fixed LOS matrix and a Rayleigh fading channel matrix, which is expressed as $$H_{Rician}(k) = \sqrt{\frac{K}{1+K}}\overline{H}(k) + \sqrt{\frac{K}{1+K}}H(k) \quad (4)$$

where $$\sqrt{\frac{K}{1+K}}\overline{H}$$

is an LOS component, $$\sqrt{\frac{1}{1+K}}H$$

is a fading component, K is a Rician K-factor.

In general, the channel matrix H(k) can be a set of vectors. Each vector corresponds to the channel path gain of a receiver antenna, given as $$H(k) = [h_1(k) h_2(k) \ldots h_{N_t}(k)]$$

where $h_v(k) = [h_{1,v}(k) h_{2,v}(k) \ldots h_{N_t,v}(k)]^T \quad (5)$

A vector received at a discrete time instant K is given as $y=h_v x_l+r$.

Now a description will be made of the SM method with reference to FIG. 3.

Exemplary embodiments of the present invention use the index of an active antenna as an information source. For example, given four transmitter antennas, four cases of activating one antenna exist. The four cases can be represented as 2-bit information. FIG. 3 illustrates an antenna bit block 300 representing an active antenna 320 and inactive antennas 330.

An exemplary embodiment of the present invention also uses a signal modulation constellation diagram as an information source. One-bit information on a BPSK constellation diagram includes +1 and −1 and two-bit information on a QPSK constellation diagram includes 1+i, 1−i, −1+i, −1−i. In M-QAM, M cases are represented as m-bit information ($m=\log_2(M)$). In FIG. 3, a signal modulation bit block 310 is mapped to a corresponding antenna.

Signal modulation and SM are applied to an n-bit input signal. Bits corresponding to the antenna bit block are encoded by SM. That is, a vector signal having as many symbols as the total number of antennas is generated such that a signal modulation symbol value is set at the symbol position corresponding to the index of an antenna to be activated.

Bits corresponding to the signal modulation bit block 310 in the input signal are encoded by signal modulation. That is, 0s are set at the symbol positions corresponding to the inactive antennas in the vector signal.

Four bits per symbol can be sent in the manner depicted in Table 1.

TABLE 1

| Four bits per symbol transmission | BPSK and eight transmit antennas |
|---|---|
| | 4QAM and four transmit antennas |
| | 8QAM and two transmit antennas |
| | 16QAM and one transmit antenna |

Given the same total number of transmittable bits, SM and signal modulation are in a trade-off relationship. The number of bits transmittable by SM is given as $$\tilde{m}=\log_2(N_t)+m \quad (6)$$

where $N_t$ is the number of transmitter antennas and m is $\log_2$(the number of cases representable on a signal modulation constellation). For M-QAM, $m=\log_2(M)$.

i-MRC and Receiver Using i-MRC

With reference to FIGS. 2 and 3, an i-MRC method and a receiver using the i-MRC method will be described.

A receiver according to an exemplary embodiment of the present invention includes receiver antennas 230, a detector 240, and a spatial demodulator 250. The receiver antennas 230 receive signals from the transmitter antennas. The detector 240 estimates the index of an active antenna and a transmitted symbol by i-MRC and ZF or MMSE. The spatial demodulator 250 demodulates the received signal using the antenna index and the transmitted symbol.

An i-MRC algorithm of an exemplary embodiment of the present invention efficiently estimates the index of the activated antenna, thereby reducing the complexity of the receiver compared to a conventional algorithm. According to the i-MRC algorithm, a received vector y(K) is multiplied by a channel path gain repeatedly. The index of the activated transmitter antenna and the transmitted symbol at an instant given time k are estimated by $g_v = h_v^H y$, For $v=1:N_t$ $g=[g_1 g_2 \ldots g_{N_t}]^T$ $\tilde{l}=\arg_v \max|g| \quad (7)$ $\tilde{x}_l Q = ({}^v g_{(v=\tilde{l})})$ where $g_v$ is a detected column vector, g is a detected vector, $\tilde{l}$ is the index of the activated antenna, $\tilde{x}_l$ is the symbol transmitted from the activated antenna, and Q(•) is the constellation of a quantization function.

If $\tilde{l}$ and $\tilde{x}_l$ are accurately estimated, the receiver demaps the original information bits directly.

With reference to FIG. 3, a method of detecting a transmitted 3-bit signal by i-MRC in case of 2×4 antennas and 4QAM modulation will be described.

The spatial modulator 210 maps an input signal q(k)=[0, 1, 1] to 4QAM symbols and the two antennas. The resulting vector $x(k)=[-1, -i, 0]^T$ is sent to the receiver antennas 230 through the transmitter antennas 220 on the MIMO flat Rayleigh channel H(k). The first antenna sends a symbol $x_l$ of x(k) and the second antenna sends 0, that is, no signal energy.

For example, for the following channel matrix H(k) that is not affected by noise, $$H(k) = \begin{pmatrix} -0.5377-0.1229i & -0.6175+0.1516i \\ -0.5450-0.0964i & -0.3271-0.0006i \\ 0.4624-0.2680i & 0.2058+0.3171i \\ 0.2854-0.1493i & -0.5190+0.2767i \end{pmatrix}$$

the receiver receives the vector expressed as $y(k)=$ [0.4149+0.6606i, 0.4486+0.6415i, −0.7304−0.1944i, −0.4348−0.1361i]$^T$.

The i-MRC detection algorithm enables error-free channel estimation. When applying the i-MRC detection algorithm to the received vector y(k), g(k)=[−1.0000−1.0000i, −0.3271−0.2978i]. Then the antenna index is estimated to 1 ($\tilde{l}=1$) and the transmitted symbol is estimated to −1−i ($\tilde{x}_l=-1-i$), by equation (7). The spatial demodulator 250 obtains a 3-bit original signal $\hat{q}(k)=[0, 1, 1]$ by decoding the transmitter antenna index and the transmitted symbol. For example, the transmitter antenna index $\tilde{l}=1$ is used to decode the antenna bit block 300 and the transmitted symbol $\tilde{x}_l=-1-i$ is used to decode the signal modulation bit block 310. The original signal is demodulated by combining the antenna bit block 300 with the signal modulation bit block 310.

As described above, an exemplary embodiment of the present invention estimates the transmitter antenna index by cross correlation between different channel paths. Therefore, the algorithm performance depends on the channel correlation, as with spatial multiplexing. While the correlation depends on channel characteristics, it does not depend on mutual coupling between the transmitter antennas. That is, no mutual coupling takes place since one transmitter antenna is activated at an instant given time.

The mutual coupling deteriorates channels, increases correlations, and reduced available capacity. Although the mutual coupling may be used in improving channel capacity in the MIMO system, this is effective on channels with high spatial correlations. Especially it is important to avoid the mutual coupling in uplink transmission. In this respect, an exemplary embodiment of the present invention eliminates correlations and increases available capacity by avoiding the mutual coupling.

SM-OFDM

Figure 4:
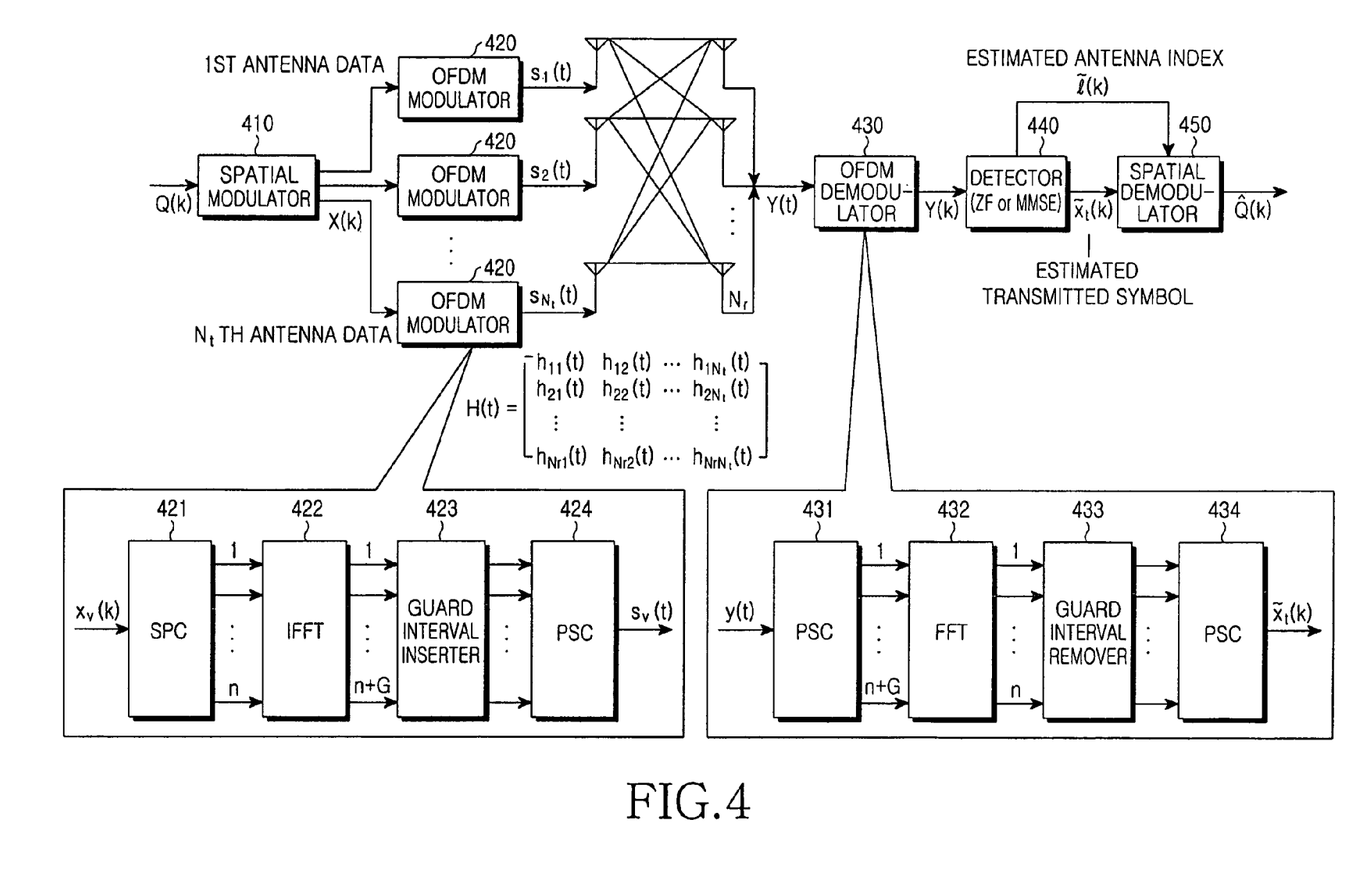
FIG. 4 is a block diagram of an SM-OFDM system according to an exemplary embodiment of the present invention.
Figure 5:
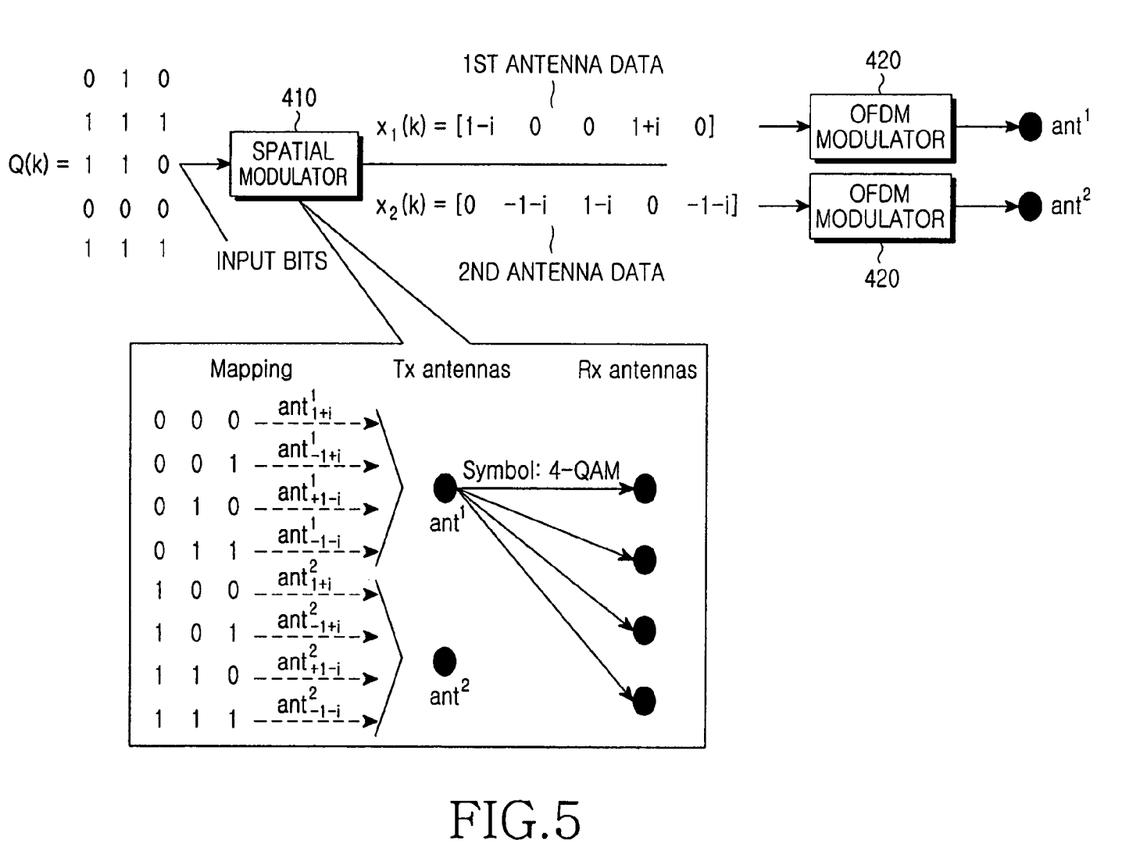
FIG. 5 illustrates an SM-OFDM method according to an exemplary embodiment of the present invention.

With reference to FIGS. 4 and 5, a transmitter and a receiver that operate based on SM and OFMD in combination, and a system including the transmitter and the receiver will be described. The transmitter sends by SM and OFDM modulation and the receiver uses OFDM demodulation, detection (i-MRC, ZF, MMSE) and spatial demodulation.

FIG. 4 is a block diagram of an SM-OFDM system according to an exemplary embodiment of the present invention and FIG. 5 illustrates an SM-OFDM method according to an exemplary embodiment of the present invention.

Referring to FIG. 4, a spatial modulator 410 modulates an n×m̃ matrix, Q(k) to an $N_t$×n matrix, X(k). Reference n is the number of OFDM subcarriers and m̃=$\log_2(N_t)$+m is the number of bits of an antenna bit block and a signal modulation bit block.

OFDM modulators 420 OFDM-modulate X(k). In each OFDM modulator 420, a Serial-to-Parallel Converter (SPC) 421 converts a serial information symbol block to parallel symbol sequences. An OFDM symbol is set to have a longer time duration than in a single-carrier system. An Inverse Fast Fourier Transform (IFFT) processor 422 performs Inverse Discrete Fourier Transform (IDFT) on the parallel symbol sequences. A guard interval inserter 423 inserts a Cyclic Prefix (CP) or a guard interval with G samples to the IDFT signals in order to cancel ISI that may be caused by channel time spread. The CP length is at least equal to the channel length. Linear convolution and channels in a transmission order are converted to circular convolution. As a result, the ISI can be cancelled perfectly. A Parallel-to-Serial Converter (PSC) 424 converts the parallel signals received from the guard interval inserter 423 to a serial signal.

A plurality of transmitter antennas multiply OFDM-modulated signals by a channel matrix and then sends the products to the receiver. The receiver antennas receive the signals from the transmitter antennas. The receiver according to an exemplary embodiment of the present invention includes an OFDM demodulator 430, a detector 440, and a spatial demodulator 450. The OFDM demodulator 430 demodulates an OFDM signal received from the transmitter antennas. The OFDM demodulator 430 includes a Parallel-to-Serial Converter (PSC) 431 for converting parallel signals received from the transmitter antennas to a serial signal. A Fast Fourier Transform (FFT) processor 432 performs Discrete Fourier Transform (DFT) on the serial signal. A guard interval remover 433 removes the CP or a guard interval with G samples to the DFT signals in order to eliminate inter-symbol interference. Another PSC 434 converts the parallel symbols received from the guard interval remover 433 to a serial symbol information block.

The detector 440 estimates an antenna index and a transmitted symbol from the received signal. The spatial demodulator 450 decodes an antenna bit block using the estimated antenna index and decodes a signal modulation bit block using the estimated transmitted symbol.

An SM-OFDM method will be described with reference to FIG. 5.

Referring to FIG. 5, the matrix Q(k) is mapped to a vector $x_v(k)$ by SM, for use in the OFDM modulators 420. Vector $x_v(k)$, which is a column vector of X(k), includes symbols to be sent through a $v^{th}$ transmitter antenna. The symbols of $x_v(k)$ represent an antenna bit block and a signal modulation bit block. In the illustrated case of FIG. 5, input bits "0, 0, 1" are divided into a signal modulation bit block "0, 0" and an antenna bit block "1". The bit blocks can be expressed as $ant_{-1,+i}^1$ which means a QPSK symbol −1+i for a first transmitter antenna. For example, since the total number of antennas is 2, an antenna bit block has one bit. A signal modulation constellation can represent four cases. Thus, the signal modulation bit block has two bits.

The multiplexed symbol vectors are re-ordered to the matrix X(k). The symbols other than the symbol for the corresponding transmitter antenna are set to 0s as illustrated in FIG. 5. Each column vector $x_v(k)$ is OFDM-modulated in a corresponding OFDM modulator 420.

Each OFDM modulator 420 generates a vector $s_v(k)$ after the OFDM modulation. Vector $s_v(k)$ includes a unique set of OFDM subcarriers. The resultant vectors are sent through the $N_t$ transmitter antennas over a MIMO channel matrix H(t). The channel matrix is an $N_r \times N_t$ block matrix of length p. Here, p is the number of channel paths for each channel link between the transmitter antennas and the receiver antennas.

A received matrix Y(t) is expressed as Y(t)=H(t)⊗S(t)+R(t) where R(t) is an Additive White Gaussian Noise (AWGN) matrix and ⊗ is time convolution.

1. SM-OFDM Multi-Channel Model

H(t) is a channel matrix being a set of $N_r \times N_t$ vectors of length p.

$$H(t) = \begin{pmatrix} h_{11}(t) & h_{12}(t) & \cdots & h_{1N_t}(t) \\ h_{21}(t) & h_{22}(t) & \cdots & h_{2N_t}(t) \\ \vdots & \vdots & \ddots & \vdots \\ h_{N_r1}(t) & h_{N_r2}(t) & \cdots & h_{N_rN_t}(t) \end{pmatrix} \quad (8)$$

Vector $h_{KV}$ is a p×l channel vector between a $K^{th}$ receiver antenna and a $V^{th}$ transmitter antenna. Containing all multipath channel gains, $h_{KV}$ is expressed as $$h_{KV}(t) = [h_{KV}^1(t) h_{KV}^2(t) \ldots h_{KV}^p(t)]^T \quad (9)$$

In an exemplary embodiment of the present invention, multiple paths between different links are statistically independent and modeled by a Monte Carlo Method (MCM). The maximum propagation delay of an indoor multipath channel is considered as 0.45 μs. Then each channel path gain is given as $$h_{KV}(\tau_\varphi, t) = \frac{1}{\sqrt{N}} \rho[\varphi] \sum_{q=1}^{N} e^{j(2\pi f_{\varphi,q} t + \theta_{\varphi,q})} \delta(\tau - \tau_\varphi) \quad (10)$$

where $f_{\varphi,q}=f_d \sin(2\pi\mu_{\varphi,q})$, $\theta_{\varphi,q}$, and N represent discrete Doppler frequencies, Doppler phases, and harmonic functions, respectively.

Propagation delay associated with a $\varphi^{th}$ channel path is $\tau_\varphi$. The quality of $\mu_{\varphi,q}$ is independent with respect to uniformly distributed random variables within a range (0, 1) for $\varphi$=1, 2, . . . , p. $\mu_{\varphi,q}$ is generated independently for each link. The maximum Doppler frequency of a frequency selective multipath channel is denoted by $f_d$. A discrete multipath profile is modeled by p[(ϕ]$^2$. A major example of channel paths between one transmitter antenna and all receiver antennas for 1×4 channel is given in FIG. 9.

2. OFDM Detection and SM

OFDM detection and SM will be described below.

For OFDM detection, ZF or MMSE is available, besides i-MRC. If ZF is used for OFDM detection, ZF detection is considered to be element-wise division of an OFDM-modulated signal. The transfer function of a discrete time channel is calculated from the DFT of a zero-padding discrete time channel impulse response. However, the receiver has to estimate which symbol was transmitted by SM. The receiver estimates an antenna index in each ZF equalizer by $$\tilde{\imath}^e = \arg\max |y_e|\, e{:}1, 2, \ldots, n \quad (11)$$

where $y_e$ represents a vector that each ZF equalizer calculates for a subcarrier e. The receiver estimates the transmitted symbol by $$\tilde{x}_l^e = Q(y_{[(j=l e), e]}) \quad (12)$$

V-BLAST detection is carried out for OFDM in the same manner as V-BLAST detection for a flat Rayleigh fading channel and can be applied to each subcarrier.

Simulation Results

The simulation results of an exemplary embodiment of the present invention will be described with reference to FIGS. 6 to 10.

A simulation was performed under the assumption that the receiver has full knowledge of every channel, and antennas at the transmitter and the receiver are spaced from one another enough to avoid correlation. The total signal power is constant at each transmission. When a total power is 1 W and a noise power is $\sigma^2$, the reception SNR of the receiver is $P/\sigma^2$. The noise is AWGN with integrity in time and space. In V-BLAST transmission, the transmitter antennas are assumed to be synchronized.

1. SSM Transmission

Figure 6:
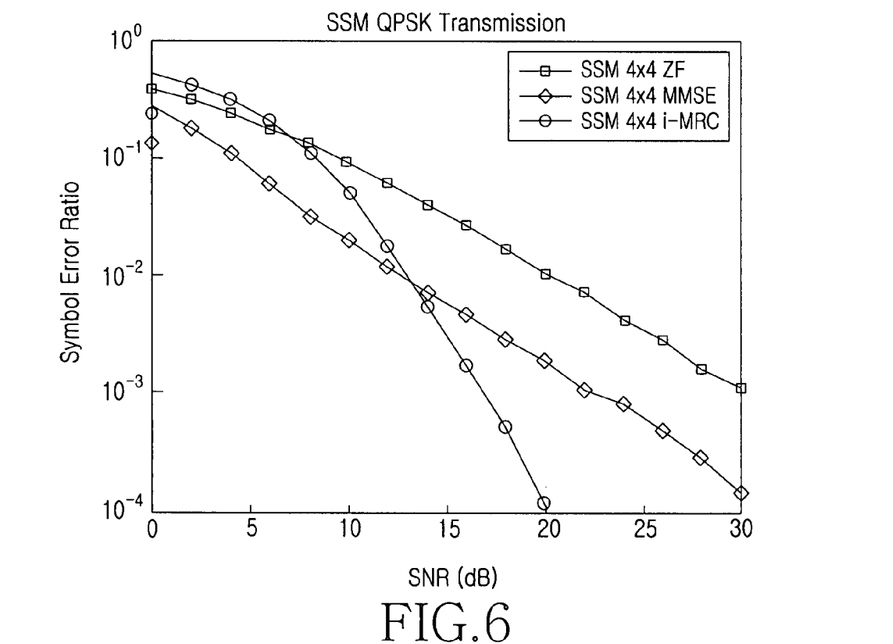
FIGS. 6 to 10 illustrate simulation results of an exemplary embodiment of the present invention.

With reference to FIG. 6, the simulation result of the SSM transmission scheme will be described. ZF, MMSE and i-MRC are used as a transmitter antenna index detection algorithm.

Figure 7:
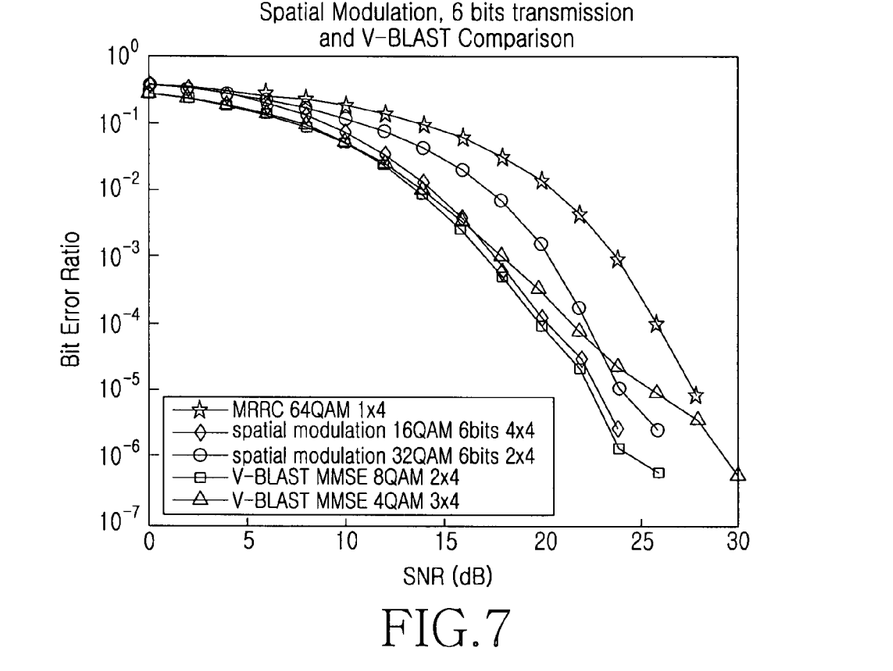

FIG. 6 illustrates the simulation result of SSM for 4×4 antennas and a flat Rayleigh fading channel. At a Symbol Error Ratio (SER) of $10^{-3}$, i-MRC outperforms MMSE by 5 dB and MMSE outperforms ZF by 8 dB. At an SER of $10^{-4}$, i-MRC also performs better than MMSE by about 10 dB. FIG. 7 reveals that the i-MRC detection method can be used as an advanced technique for reducing inter-symbol errors.

Yet, a different result may be created for a different number of antennas. For example, when the number of receiver antennas is larger than the number of transmitter antennas, ZF or MMSE increases quality whereas i-MRC does not increase quality much. This is because SSM uses the index of an activated transmitter antenna as an information source.

While SSM offers good performance at an SER, the addition of parity bits leads to inefficient transmission and SSM is confined to BPSK and QPSK. This problem can be solved by SM.

2. SM

The simulation results of SM will be described with reference to FIGS. 7 and 8.

FIG. 7 is a graph comparing MRRC 1×4 64-QAM, SM 4×4 16-QAM, SM 2×4 32-QAM, MMSE 2×4 8-QAM, and MMSE 3×4 4-QAM with one another in terms of the Bit Error Ratio (BER) performance of a Rayleigh flat channel. The SM 4×4 16-QAM transmission and the MMSE 2×4 8-QAM transmission have almost the same performance. The MMSE 3×4 4-QAM transmission demonstrates a significant performance degradation due to propagation errors and high ISI at the receiver. The SM 4×4 16-QAM transmission of an exemplary embodiment of the present invention performs better than the 1×4 64-QAM MRRC transmission by about 7 dB. The simulation result of FIG. 2 reveals that the SM scheme of an exemplary embodiment of the present invention is efficiency on the Rayleigh flat channel.

Meanwhile, V-BLAST with Successive Interference Cancellation (SIC) performs poorly for a higher Rician K factor. This can be explained by a correlation increase caused by the existence of an LOS component. However, since SM sends one symbol at one time, thus avoiding ISI, no serious degradation takes place to SM despite the increase of the K factor. Now a description will be made of the simulation result of a comparison between SM and V-BLAST in case of 6-bit transmission on a Rician fading channel model.

Figure 8:
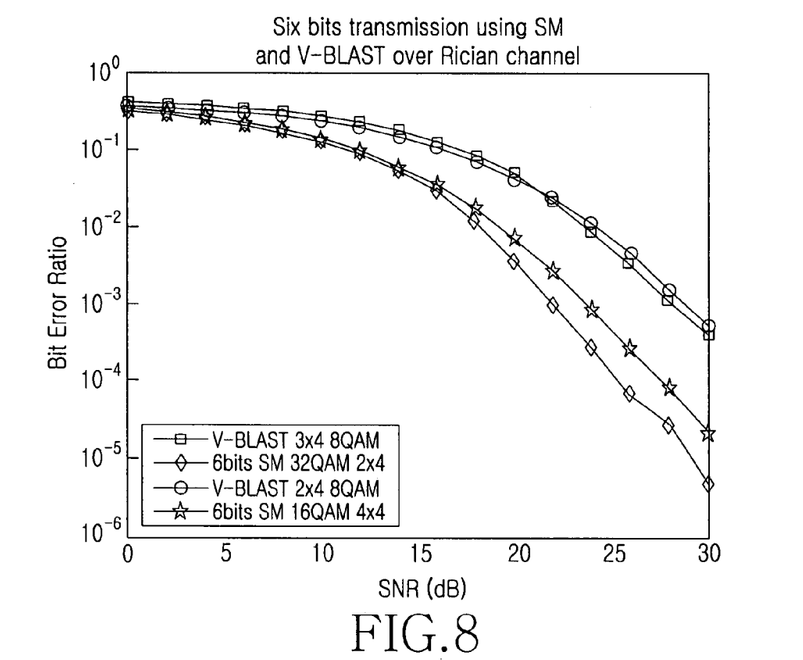

FIG. 8 is a graph comparing SM with V-BLAST in terms of BER performance for a Rician channel factor K=2. SM 2×4 32-QAM is similar in performance to SM 4×4 16-QAM at low SNRs and the former has about 2 to 3-dB gain at higher SNRs, relative to the latter. On the other hand, SM outperforms V-BLAST by 5 to 15 dB. As noted from FIG. 8, the SM scheme of an exemplary embodiment of the present invention can be used as a modulation scheme with better BER performance than the existing V-BLAST method when the Rician channel factor K increases.

FIGS. 7 and 8 reveal that SM outperforms V-BLAST in the presence of LOS. At a BER of $10^{-2}$, V-BLAST produces about 11-dB performance degradation, while SM degrades performance by no more than 4 dB. That is, SM performs better than V-BLAST.

3. SM-OFDM Transmission

Figure 9:
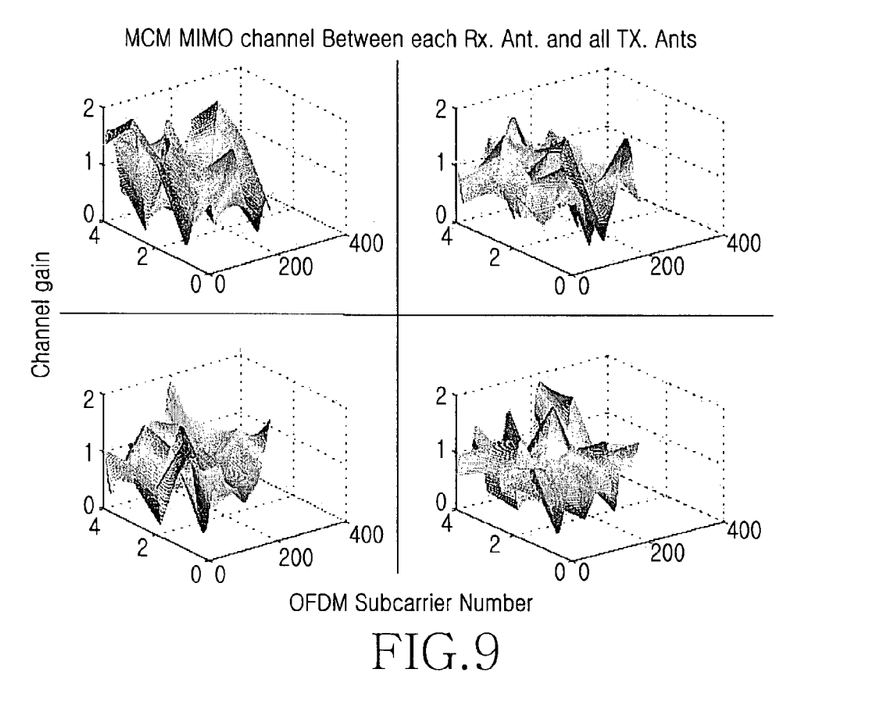
Figure 10:
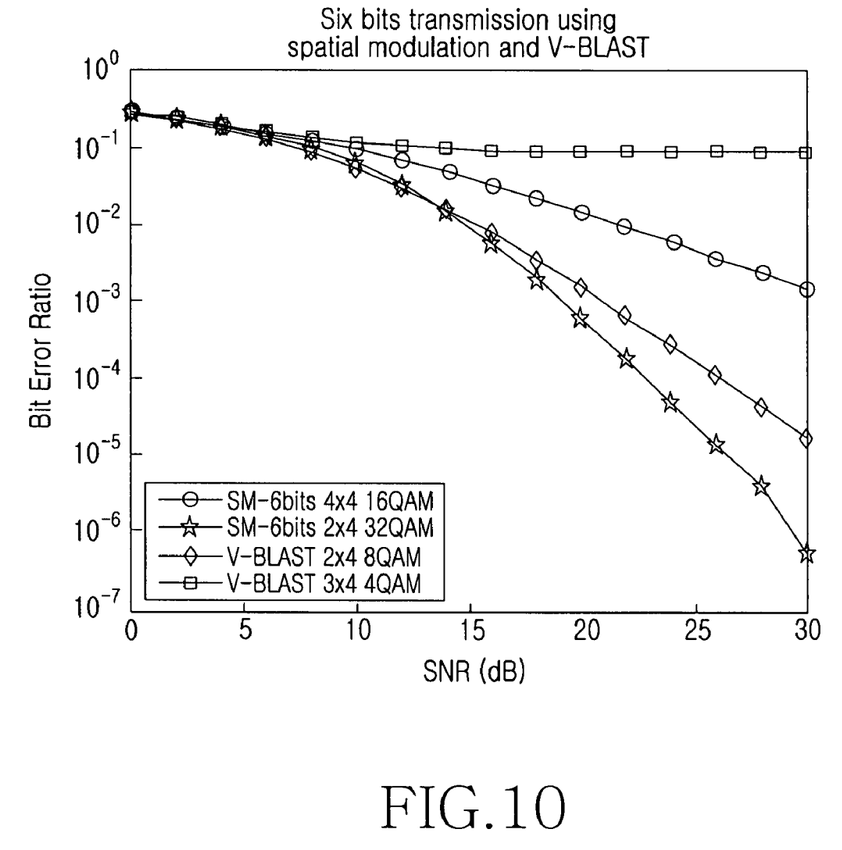

With reference to FIGS. 9 and 10, the simulation results of SM-OFDM transmission according to an exemplary embodiment of the present invention will be described.

It is assumed that the afore-described SM-OFDM system has a maximum Doppler frequency of 30 Hz, an OFDM symbol with a length of 20 frames has 256 OFDM subcarriers, a sampling interval ta=1/BW=50 ns. A channel delay spread is 0.45 μs and a guard interval is 0.5 μs.

FIG. 9 illustrates channel gain versus the number of OFDM subcarriers and FIG. 10 illustrates a graph comparing SM 4×4 16-QAM, SM 2×4 32-QAM, V-BLAST 2×4 8-QAM, and V-BLAST 3×4 4-QAM in terms of SNR versus BER.

Referring to FIG. 10, SM-OFDM has less performance degradation than V-BLAST even when $N_t = N_r$. V-BLAST demonstrates an error flow in the case of 3×4 antennas.

2×4 32-QAM SM-OFDM performs almost as well as 2×4 8-QAM V-BLAST at SNR<16 and the former outperforms the latter by about 2 dB. Also, 2×4 32-QAM SM-OFDM performs better than 4×4QAM 16QAM and 3×4 V-BLAST-OFDM 4QAM. 3×4 4QAM V-BLAST-OFDM performs poorly than any other scheme. The simulation results of FIG. 10 reveal that the SM-OFDM scheme of an exemplary embodiment of the present invention is very effective in terms of SNR versus BER.

4. Measuring Receiver Complexity

The conventional V-BLAST scheme is compared with SSM and SM according to an exemplary embodiment of the present invention in terms of receiver complexity. An exemplary embodiment of the present invention reduces the demodulation complexity of the receiver, compared to the conventional V-BLAST algorithm.

Complexity is measured by decimal additions and multiplications. The Singular Value Decomposition (SVD) complexity performance of a matrix $H = \Gamma \Sigma \Delta^H$ using R-SVD is $4N_r^2 N_t + 22N_t^3$ (refer to [23], [24]).

The pseudoinverse matrix of H, $H^+ = \Sigma \Delta^{-1} \Gamma^H$ takes $N_r^2 N_t + N_r^2$ complex computations. Therefore, $5N_r^2 N_t + 22N_t^3 + N_t^2$ complex computations are required in total. The total number of complex computations is given as $$\sum_{i=1}^{N_t} (5N_r^2 i + 22 i^3 + i^2) \quad (15)$$

MMSE complexity is calculated in a similar manner. Using Gaussian elimination for computation of an inverse matrix, the total number of complex computations is calculated by $$\sum_{i=1}^{N_t}(5i^3+N_r i^2+i^2) \qquad (16)$$

If $N_t=1$, MRC requires a complexity of $N_r^2$. Thus, the complexity is multiplied as many times as repetitions for i-MRC. The reason for $N^t$ repetitions for i-MRC is to calculate the index of a transmit antenna and a transmitted symbol. Therefore, i-MRC requires $N^t N_r^2$ complex computations. The same complexity is taken when i-MRC is applied to SM.

Let the number of complex computations be denoted by $\zeta$. Then i-MRC detection for SM and V-BLAST detection are compared in receiver complexity in Table 2 below.

TABLE 2

| | 8QAM V-BLAST | | 4QAM V-BLAST | | Spatial Modulation | |
|---|---|---|---|---|---|---|
| | ZF | MMSE | ZF | MMSE | 16QAM | 32QAM |
| $\zeta$ | 443 | 110 | 1286 | 560 | 64 | 32 |

In SM-OFDM transmission, ZF detection takes $n(5N_r^2 N_t + 22N_t^3 + N_t^2)$ complex computations. Table 3 illustrates the demodulation complexities of an SM-OFDM receiver and a V-BLAST-OFDM receiver, for 256 subcarriers.

TABLE 3

| | V-BLAST | | SM | |
|---|---|---|---|---|
| | 8QAM | 4QAM | 16QAM | 32QAM |
| $\zeta$ | 113408 | 329216 | 446464 | 87040 |

4×4 16-QAM SM-OFDM requires a larger number of complex computations than V-BLAST-OFDM. However, 2×4 32-QAM SM-OFDM offers a 26.44% decrease in demodulation complexity, relative to V-BLAST-OFDM. Table 2 and Table 3 reveal that the SM-OFDM scheme of the present invention efficiently reduces OFDM demodulation complexity at the receiver.

As described above, an exemplary embodiments of the present invention activates one transmit antenna in a MIMO system. Therefore, the need for synchronization among transmit antennas is obviated, ISI at a receiver is cancelled, and transmission efficiency per unit hertz is increased using an antenna layout as information.

Furthermore, the use of SM in a MIMO-OFDM system reduces the demodulation complexity of the receiver, creating a spatial diversity gain.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A spatial modulation method in a Multiple-Input Multiple-Output (MIMO) system, the spatial modulation method comprising:
   receiving a signal with a plurality of bits;
   separating the received signal into an antenna bit block and a signal modulation bit block;
   encoding the signal modulation bit block in a signal modulation scheme; and
   encoding the antenna bit block with an of an antenna to be activated.

2. The spatial modulation method of claim 1, wherein the separating of the received signal comprises:
   separating $\log_2$(total number of antennas) bits of the received signal as the antenna bit block; and
   separating $\log_2$(total number of all possible cases representable by a signal modulation constellation) bits of the received signal as the signal modulation bit block.

3. The spatial modulation method of claim 1, wherein the signal modulation scheme comprises Binary Phase Shift Keying (BPSK), or Quadrature Phase Shift Keying (QPSK), or Quadrature Amplitude Modulation (QAM), or any combination thereof.

4. The spatial modulation method of claim 1, wherein the encoding of the signal modulation bit block comprises:
   generating a vector signal with as many symbols as a total number of antennas; and
   setting a symbol at a position corresponding to the index of the antenna to be activated in the vector signal to a signal modulation symbol value.

5. The spatial modulation method of claim 4, wherein the encoding of the antenna bit block comprises setting a symbol at a position corresponding to an inactive antenna in the vector signal to 0.

6. A transmitter using spatial modulation in a Multiple-Input Multiple-Output (MIMO) system, the transmitter comprising:
   a separator to receive a signal with a plurality of bits, and separate the received signal into an antenna bit block and a signal modulation bit block;
   a signal modulation encoder to encode the signal modulation bit block in a signal modulation scheme; and
   an antenna index encoder to encode the antenna bit block with an index of an antenna to be activated.

7. The transmitter of claim 6, further comprising a plurality of antennas comprising an active antenna to transmit the modulated signal during a unit time, and at least one inactive antenna to transmit no signal during the unit time.

8. The transmitter of claim 7, wherein the plurality of antennas transmit modulated signals over a channel having a channel matrix expressed as follows:

$H(k)=[h_1(k)\ h_2(k) \ldots h_{N_t}(k)]$ where $h_v(k)=[h_{1,v}(k)\ h_{2,v}(k) \ldots h_{N_r,v}(k)]^T$.

9. The transmitter of claim 7, further comprising a plurality of Orthogonal Frequency Division Multiplexing (OFDM) modulators to output OFDM-modulated signals to the plurality of antennas.

10. The transmitter of claim 6, wherein the signal modulation encoder generates a vector signal with as many symbols as a total number of antennas, and sets a symbol at a position corresponding to the index of the antenna to be activated in the vector signal to a signal modulation value.

11. The transmitter of claim 10, wherein the antenna index encoder sets a symbol at a position corresponding to an inactive antenna in the vector signal to 0.

12. The transmitter of claim 6, further comprising a spatial modulator to encode the index of the antenna to be activated to a multi-symbol signal.

13. A method of detecting a spatial modulation signal in a Multiple-Input Multiple-Output (MIMO) system, the method comprising:
   calculating, using a detector in a receiver that receives a signal, a detected vector by multiplying a vector in the received signal by a channel path gain repeatedly;

estimating, using the detector, an antenna index using a maximum absolute value of an independent variable of the detected vector; and estimating, using the detector, a transmitted symbol using a constellation of a detected column vector of a quantization function in which an antenna index is equal to the estimated antenna index.

14. The method of claim 13, wherein the calculating of a detected vector, the estimating of an antenna index, and the estimating of a transmitted symbol are performed according to the following equations:

$$g_v = h_v^H y, \text{ For } v=1:N_t$$

$$g = [g_1\ g_2 \cdots g_{N_t}]^T$$

$$\tilde{l} = \arg\max |g|$$

$$\tilde{x}_l = Q(\,g_{(v=\tilde{l})})$$

where y is the vector in the received signal, h is the channel path gain, $g_v$ is the detected column vector, g is the detected vector, $\tilde{l}$ is the estimated antenna index, $\tilde{x}_l$ is the estimated transmitted symbol, and $Q(\cdot)$ is the constellation of a quantization function.

15. A receiver using spatial modulation signal detection in a Multiple-Input Multiple-Output (MIMO) system, the receiver comprising:

a plurality of receiver antennas to receive a signal from a plurality of transmitter antennas;

a detector to estimate an antenna index and a transmitted symbol from the received signal; and a spatial demodulator to decode an antenna bit block using the estimated antenna index, and decode a signal modulation bit block using the estimated transmitted symbol.

16. The receiver of claim 15, further comprising an Orthogonal Frequency Division Multiplexing (OFDM) demodulator to demodulate an OFDM signal received by the plurality of receiver antennas from the plurality of transmitter antennas.

17. The receiver of claim 15, wherein the detector calculates a detected vector by multiplying a vector in the received signal by a channel path gain repeatedly, estimates the antenna index using a maximum absolute value of an independent variable of the detected vector, and estimates the transmitted symbol using a constellation of a detected column vector of a quantization function in which an antenna index is equal to the estimated antenna index.

18. The receiver of claim 15, wherein the detector comprises a Minimum Mean Square Error (MMSE) equalizer and/or a Zero-Forcing (ZF) equalizer.

19. The receiver of claim 18, wherein the ZF equalizer calculates the antenna index according to the following equation:

$$\tilde{l}^e = \arg\max |y_e|\ e: 1, 2, \ldots, n,$$

and calculates the transmitted symbol according to the following equation:

$$\tilde{x}_l^e = Q(y_{[(j=\tilde{l}e),e]}),$$

where $y_e$ represents a vector that the ZF equalizer calculates for a subcarrier e.

20. A Multiple-Input Multiple-Output (MIMO) system using spatial modulation and spatial modulation detection, the MIMO system comprising:

a spatial modulator to encode an index of an activated antenna to a multi-symbol signal;

a plurality of transmitter antennas to transmit a modulated signal of a signal modulation encoder through one activated antenna during a unit time;

a plurality of receiver antennas to receive the modulated signal from the plurality of transmitter antennas;

a detector to estimate an antenna index and a transmitted symbol from the received modulated signal; and a spatial demodulator to decode the multi-symbol signal using the estimated antenna index and the estimated transmitted symbol.

21. The MIMO system of claim 20, further comprising:

a plurality of Orthogonal Frequency Division Multiplexing (OFDM) modulators to output OFDM-modulated signals to the plurality of transmitter antennas; and a plurality of OFDM demodulators to demodulate OFDM-modulated signals received by the plurality of receiver antennas from the plurality of transmitter antennas.

22. The MIMO system of claim 20, wherein the spatial modulator comprises:

a separator to receive a signal with a plurality of bits, and separate the received signal into an antenna bit block and a signal modulation bit block;

a signal modulation encoder to encode the signal modulation bit block in a signal modulation scheme; and an antenna index encoder to encode the antenna bit block with the index of the activated antenna.

23. The MIMO system of claim 20, wherein the detector calculates a detected vector by multiplying a vector in the received modulated signal by a channel path gain repeatedly, estimates the antenna index using a maximum absolute value of an independent variable of the detected vector, and estimates the transmitted symbol using a constellation of a detected column vector of a quantization function in which an antenna index is equal to the estimated antenna index.

24. The MIMO system of claim 20, wherein the spatial demodulator decodes an antenna bit block using the estimated antenna index, decodes a signal modulation bit block using the estimated transmitted symbol, and demodulates a signal comprising a combination of the antenna bit block and the signal modulation bit block.

25. A spatial modulation method in a Multiple-Input Multiple-Output (MIMO) system, the spatial modulation method comprising:

encoding an index of an activated antenna to a multi-symbol signal;

transmitting a modulated signal of a signal modulation encoder through at least one activated transmitter antenna during a unit time;

receiving the modulated signal of the signal modulation encoder from the at least one activated transmitter antenna;

estimating an antenna index and a transmitted symbol from the received modulated signal; and decoding the multi-symbol signal using the estimated antenna index and the estimated transmitted symbol.

26. The spatial modulation method of claim 25, further comprising:

outputting Orthogonal Frequency Division Multiplexing (OFDM)-modulated signals to the at least one activated transmitter antenna; and demodulating OFDM-modulated signals received from the at least one activated transmitter antenna.

27. The spatial modulation method of claim 25, wherein the encoding of the index of the activated antenna to a multi-symbol signal comprises:

receiving a signal with a plurality of bits;

separating the received signal into an antenna bit block and a signal modulation bit block;

encoding the signal modulation bit block in a signal modulation scheme; and encoding the antenna bit block with the index of the activated antenna.

28. The spatial modulation method of claim 25, wherein the estimating of the antenna index and the transmitted symbol from the received modulated signal comprises:

calculating a detected vector by multiplying a vector in the received modulated signal by a channel path gain repeatedly;

estimating the antenna index using a maximum absolute value of an independent variable of the detected vector; and estimating the transmitted symbol using a constellation of a detected column vector of a quantization function in which an antenna index is equal to the estimated antenna index.

29. The spatial modulation method of claim 25, wherein the decoding of the multi-symbol signal comprises:

decoding an antenna bit block using the estimated index;

decoding a signal modulation bit block using the estimated transmitted symbol; and demodulating a signal comprising a combination of the antenna bit block and the signal modulation bit block.

* * * * *